United States Patent [19]

Rodgers et al.

[11] Patent Number: 6,131,140
[45] Date of Patent: Oct. 10, 2000

[54] INTEGRATED CACHE MEMORY WITH SYSTEM CONTROL LOGIC AND ADAPTATION OF RAM BUS TO A CACHE PINOUT

[75] Inventors: Thurman J. Rodgers, Woodside; Raymond M. Leong, Los Altos; Peter Voss, Aromas; Tek Wei, Cupertino, all of Calif.

[73] Assignee: Cypress Semiconductor Corp., San Jose, Calif.

[21] Appl. No.: 08/577,895

[22] Filed: Dec. 22, 1995

[51] Int. Cl.$^7$ .................................................. G06F 13/00
[52] U.S. Cl. ........................... 711/104; 711/100; 711/118; 711/154
[58] Field of Search ..................................... 395/445, 308, 395/456, 402; 711/118, 129, 2, 3, 104, 729, 147, 154; 710/100

[56] References Cited

U.S. PATENT DOCUMENTS

| | | | |
|---|---|---|---|
| 4,674,089 | 6/1987 | Poret et al. | 371/25 |
| 4,794,524 | 12/1988 | Carberry et al. | 364/200 |
| 4,888,679 | 12/1989 | Fossum et al. | 364/200 |
| 5,247,642 | 9/1993 | Kadlec et al. | 395/425 |
| 5,317,706 | 5/1994 | Pechter | 395/402 |
| 5,345,576 | 9/1994 | Lee et al. | 395/425 |
| 5,519,839 | 5/1996 | Culley et al. | 395/310 |
| 5,602,984 | 2/1997 | Mieras | 345/501 |
| 5,617,576 | 4/1997 | Solari et al. | 395/800 |
| 5,627,991 | 5/1997 | Hose, Jr. et al. | 395/456 |
| 5,634,013 | 5/1997 | Childers et al. | 395/280 |

FOREIGN PATENT DOCUMENTS

| | | |
|---|---|---|
| 91300724 | 1/1991 | European Pat. Off. . |
| 91300734 | 1/1991 | European Pat. Off. . |

OTHER PUBLICATIONS

Short, Kenneth L., "Microprocessors and Programmed Logic", Prentice–Hall, Inc., pp. 341–343, 1987.

Millman, Jacob, "Microelectronics: Digital and Analog Circuits and Systems", McGraw–Hill, Inc., pp. 311–312, 1979.

Savitzky, Stephen, "Real–Time Microprocessor Systems", Van Nostrand Reinhold Company, Inc., pp. 5–6, 1985.

Short, Kenneth, "Microprocessors and Programmed Logic", Prentice–Hall, Inc., p. 8, 1987.

Handy, Jim, "The Cache Memory Book", Acedemic Press, pp. 18–19, 22 and 122, 1993.

Hennessy et al., "Computer Organization and Design: The Hardware/Software Interface", Morgan Kaufmann Publishers, pp. 184, 283, 533–535, B8–B9, B18–B19 and B30, 1994.

"Rossini Pentium PCI–ISA Chip Set", Symphony Laboratories, p. 14, Jun. 7, 1995.

(List continued on next page.)

*Primary Examiner*—Tuan V. Thai
*Attorney, Agent, or Firm*—Blakely, Sokoloff, Taylor & Zafman LLP

[57] ABSTRACT

An integrated circuit and computer system. According to one embodiment of the present invention an integrated circuit on a single substrate for use with a microprocessor which is coupled to a processor bus is provided, and the integrated circuit includes a cache random access memory array and a data path logic control unit, such as multiplexer which is coupled to the cache random access memory array and has an output for coupling to the processor bus. In one embodiment, a further multiplexer having an output for coupling to a first portion of a memory is provided, and this multiplexer further has input for coupling to a second portion of the memory bus. The IC according the present invention is also for use with a second IC which includes control logic for controlling system memory and for controlling the processor bus and memory bus as well as interfacing to other buses such as peripheral bus. The present invention also provides for improved layout of a cache array with a data path logic management unit as well as power management features for the cache array and a tag RAM with comparator on, in one embodiment, the same chip with the cache array or on an associated chip in another embodiment.

38 Claims, 14 Drawing Sheets

OTHER PUBLICATIONS

Betty Prince, "John Wiley & Sons", *Semiconductor Memories A Handbook of Design, Manufacture and Application*, Second Edition, pp. 55–59 & 84–85.

Intel, Chapter 2 "MicroProcessor Architecture Overview", pp. 2/1–2/4, 1994.

Intel, 82430FX PCIset Cache/Memory Subsystem, 82437FX System Controller (TSC), 82438FX Data Path (TDP), pp. 1–8, Jun. 1995.

OPTi, "Viper Notebood Chipset", pp. 1–5, Jun. 1994.

VLSI Technology, Inc., "Preliminary Product Specification, VL82C541", pp. 1–2, May 1995.

Silicon Integrated System Corp., "Shared Memory, SiS5511/2/3, SiS6205", pp. 10–15, Jul. 3, 1995.

VIA, "VT82C570MV, Apollo 'PLUS', Green Pentium/P54C, PCI/ISA System with Plug and Play, Enhanced IDE and Dual Processor Support", pp. 1–7, Jan. 25, 1995.

INTEGRATED CACHE MEMORY WITH SYSTEM CONTROL LOGIC AND ADAPTATION OF RAM BUS TO A CACHE PINOUT

FIELD OF THE INVENTION

The field of the present invention relates generally to computer systems having cache memory, and more particularly to integrated circuits (ICs) employed in such computer systems which ICs provide cache memory as well as control logic for the entire computer system.

BACKGROUND OF THE INVENTION

It is well known that faster computer systems are generally more desirable than the slower computer systems because the faster computer systems can process more data and provide faster feedback to users. One approach in designing computer systems in order to increase the speed of the computer system is to provide a cache memory which, while expensive, is faster than conventional, cheaper memory. The cache memory is used to store more frequently accessed data and can operate at a higher frequency than the cheaper, slower conventional memory. An example of faster cache memory is conventional static random access memory (SRAM) which may operate with microprocessors having operating frequencies greater than 100 MHz. While it would be possible to implement all of the computer's system memory using fast SRAM, this is an expensive proposition. Implementing a portion of the memory used by the processor in cache which is made from SRAM provides a price/performance tradeoff—the slow DRAM memory may be large in order to store larger amounts of data and instructions while the SRAM may provide high speed performance for frequently accessed data and/or instructions.

FIG. 1a shows a typical implementation of a computer system in the prior art, which implementation includes a cache memory array, in the form of SRAM, along with slower dynamic random access memory (DRAM). A conventional microprocessor 10, such as a Pentium microprocessor is coupled to a processor bus 11 which includes data and address lines as well as control lines. The cache memory array 12, a system control and cache/DRAM control 15 and a data path logic unit 23 are also coupled to the processor bus 11. DRAM 25, typically comprising a plurality of DRAM integrated circuits (ICs), is coupled to the processor bus 11 through the data path logic 23 and typically receives address signals from the processor bus 11 through the interconnect bus 16 which is coupled to the system control and cache/DRAM control unit 15. The system control and cache/DRAM control unit 15 will be appreciated to be the conventional core logic chipsets which are provided by numerous vendors. These chipsets act as "glue" logic to coordinate the interaction of the components of the computer system, including the microprocessor and the processor bus as well as the cache and the DRAM memory and to also provide an interface to an expansion bus, such as a PCI bus. In FIG. 1a, the bus 19 may be a PCI bus and is coupled to the system control and cache/DRAM control unit 15. The system control and cache/DRAM control unit 15 is also coupled to a tag RAM 14 which is used to store a directory of entries in the cache RAM array. As is well known, the tag RAM stores addresses of system memory which have been cached into the cache memory; when the processor requests data by providing an address over the processor bus 11, the system control unit 15 reads that address and checks the tag RAM 14, which is normally implemented in fast SRAM 12 to determine whether the data requested by the processor is stored in the cache SRAM. If it is not, the system control and cache/DRAM control unit 15 then requests the data from the DRAM 25 utilizing the data path logic unit 23 and the interconnect bus 16 to retrieve the data from the DRAM 25 via the data path logic unit 23. At the same time, depending on the write policy implemented in the computer system relative to the cache array, the same data is provided to the cache to update the cache array 12. Since the use of cache in computer systems is well known, much of the details concerning cache operation will not be reiterated here.

The computer system shown in FIG. 1a, also typically includes a bus 19 which is coupled to a graphics controller 17 and to a peripheral controller 21. The graphics controller 17 typically includes a frame buffer which is used to drive a CRT 18 to provide an output to a user of the computer system. The peripheral controller 21 controls the operation including the input and output operation of a peripheral unit such as the peripheral device 20. It will be appreciated that the peripheral 20 may be a hard disk or a network controller. In one implementation, the bus 19 is a PCI bus operated pursuant to the PCI standard which is well known in the art. The computer system shown in FIG. 1a typically also includes a further bus controller 27 which is coupled between the bus 19 and an expansion bus 29. It will be appreciated that typically the processor bus 11 operates at a very high frequency (e.g. 50 MHz) while the bus 19 operates at a slower frequency, and the bus 29 operates at an even slower frequency. Thus, slower operating peripherals are typically coupled to the bus 29, such a floppy disk drive or serial and parallel ports 33 and the BIOS ROM 31.

In the computer system shown in FIG. 1a, the cache 12 is a group of separate integrated circuits (ICs) which are coupled to the processor bus and which are controlled by the system control and cache/DRAM control unit 15. As indicated above, this control unit 15 is typically one or a plurality of so called core logic chips or a chipset which is provided by many different semiconductor companies, including for example Intel Corporation of Santa Clara, Calif., and Cypress Semiconductor Corporation of San Jose.

FIG. 1b shows a simplified version of a portion of FIG. 1a. In particular, FIG. 1b shows a Pentium microprocessor 10a which is coupled via a processor bus having an address portion 11a and a data portion 11b to a plurality of SRAM ICs. A core logic chipset 15a is coupled to the address bus and provides control signals to the SRAM ICs. It will be appreciated that the DRAM and the buses 19 and 29 and the associated components coupled to buses 19 and 29 are not shown in FIG. 1b. In a typical embodiment represented by FIG. 1b, the Pentium microprocessor will be coupled to a 256 kilobyte (KB) cache which is composed of 8 SRAM chips or ICs. Thus, there will be at least one core logic chip and 8 SRAM chips all of which tend to heavily load the address and control lines due to the number of packages and longer traces between the packages which contain the integrated circuits. The system in FIG. 1b also consumes considerable power and also emits a considerable amount of electromagnetic radiation (which tends to cause electromagnetic interference—EMI) due to the number of packages and longer traces on a printed circuit board which is used to hold the Pentium microprocessor as well as the core logic chip or chipset 15a and the 8 SRAM chips 12a through 12h. Two main factors govern the loading at the address lines and control lines (such as the output enable and chip select lines): the number of packages or chips and the trace length on the printed circuit board used to hold the packages. Eight packages alone often present a minimum load of 40 pF. The trace length is largely determined by the physical space required to accommodate the CPU (e.g. the pentium microprocessor or other processors), the chipset which provides the system control, and the cache SRAMs. With eight SRAM chips the trace length can be 6 inches or longer, contributing another 20 to 30 pF to the signal loading. It will be appreciated that the signal loading slows down the operating speed of the system. It will also be appreciated that the electromagnetic radiation emitted from the various tracings and chips also is undesirable.

SUMMARY OF THE INVENTION

The present invention provides an improved computer system and improved integrated circuits (IC). In one embodiment of the invention, which is for use with a microprocessor which is coupled to a processor bus, an integrated circuit on a single semiconductor substrate includes a cache random access memory (RAM) array and core logic control, such as a data path logic and, in some embodiments further control logic. In one embodiment, the data path logic or control logic includes a multiplexer on the same substrate as the cache RAM array, where the multiplexer is coupled to the cache RAM array and has an output for coupling to the processor bus. In another embodiment, a further multiplexer on the same semiconductor substrate which includes the cache RAM array is provided. This further multiplexer has an output for coupling to a first data bus and has a input for coupling to a second data bus, where the first data bus and second data bus are part of a memory bus coupled to system memory, such as DRAM.

In yet another embodiment, the integrated circuit of the present invention may further include logic to stop the clocking operations for the cache RAM array. In one embodiment, the clock logic operates to stop the clocking of the various registers which operate with the cache RAM array and to stop the clocking of other mechanisms which use the clock.

According to another embodiment of the present invention, a cache tag RAM with a comparator is incorporated onto the same single semiconductor substrate with the cache random access memory array or may be on an associated chip which includes other core logic functions which are typically required to support a computer system.

According to another aspect of the present invention, the integrated circuit which includes the cache RAM array includes a first plurality of pads which are for coupling to the processor bus and a second plurality of pads on the integrated circuit for coupling to the memory bus. According to this embodiment, the first plurality of pads are interleaved with the second plurality of pads near the periphery of the integrated circuit. This improves the metal routing on the integrated circuit.

The present invention also provides a computer system which includes a microprocessor, a memory bus, a processor bus coupled to the microprocessor, and an integrated circuit according to the present invention which on a single semiconductor substrate includes a cache RAM array and a first multiplexer having an output coupled to the processor bus and having a first input coupled to an output of the cache RAM array and a second input coupled to the memory bus. This integrated circuit also typically includes a second multiplexer having an output for coupling to a first bus of the memory bus and having an input for coupling to a second bus of the memory bus, where the first and second buses of the memory bus form a first data bus and a second data bus.

The present invention typically provides a reduced number of components in the computer and so there are fewer chips. This reduces the loading and shortens trace lengths thus resulting in a cheaper system which typically runs faster, consumes less power and emits less electromagnetic interference.

BRIEF DESCRIPTION OF THE DRAWINGS

The present invention is illustrated by way of example and not limitation in the figures of the accompanying drawings.

DETAILED DESCRIPTION

The following description sets forth numerous specific details in order to provide a thorough understanding of the present invention. However, after reviewing the specification, it will be understood by those skilled in the art that the present invention may be practiced without these specific details. For example, various signals, frequencies, memory sizes, bus sizes, pinout patterns, layout patterns and other details may be modified according to the teachings of the present invention. In other instances, well known structures, protocols and techniques and devices have not been described in detail in order to not unnecessarily obscure the present invention.

Figure 2:
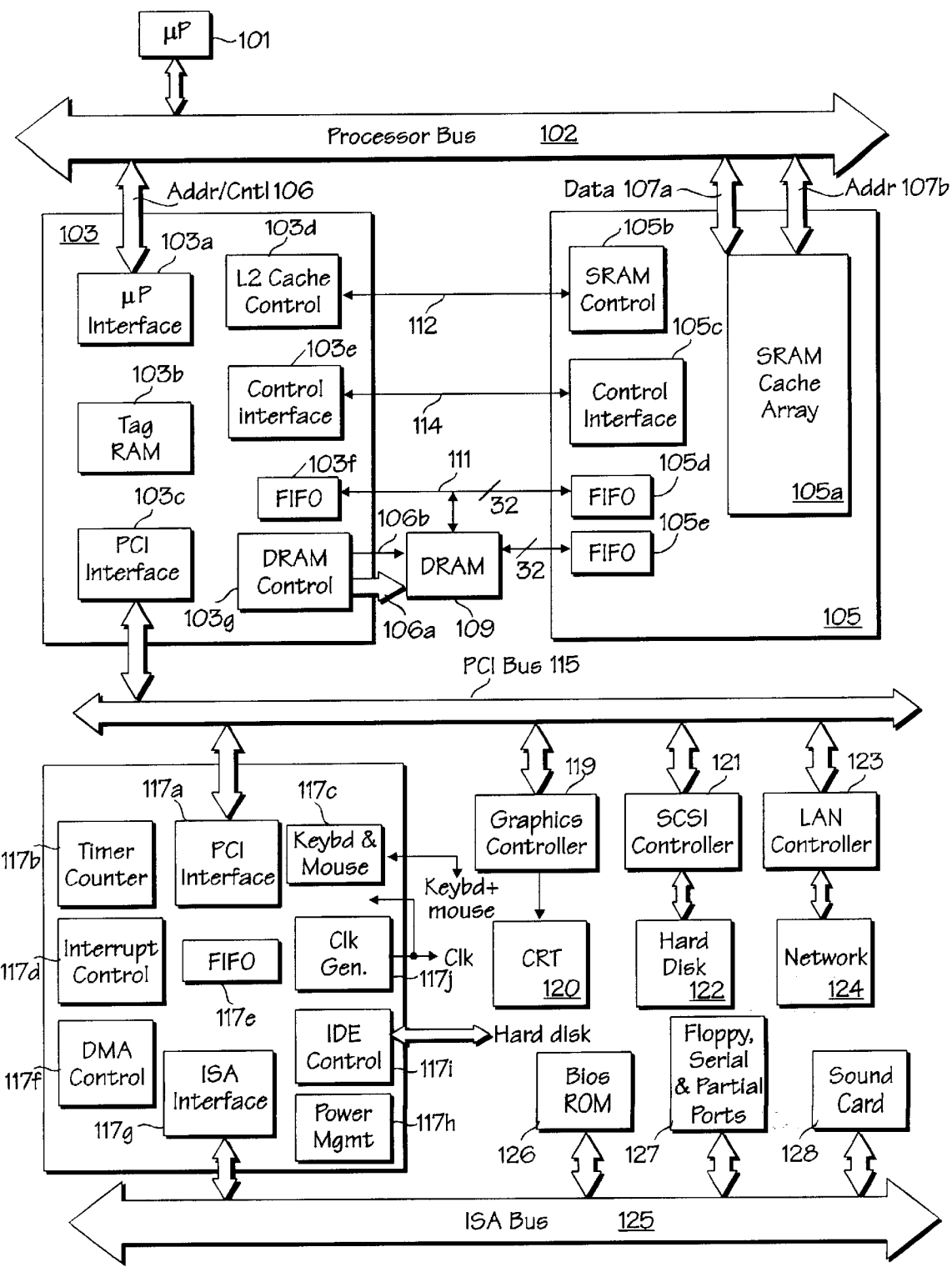
FIG. 2 illustrates a computer system of the present invention which includes an integrated circuit having a cache array along with core logic control, such as the data path control.
Figure 3A:
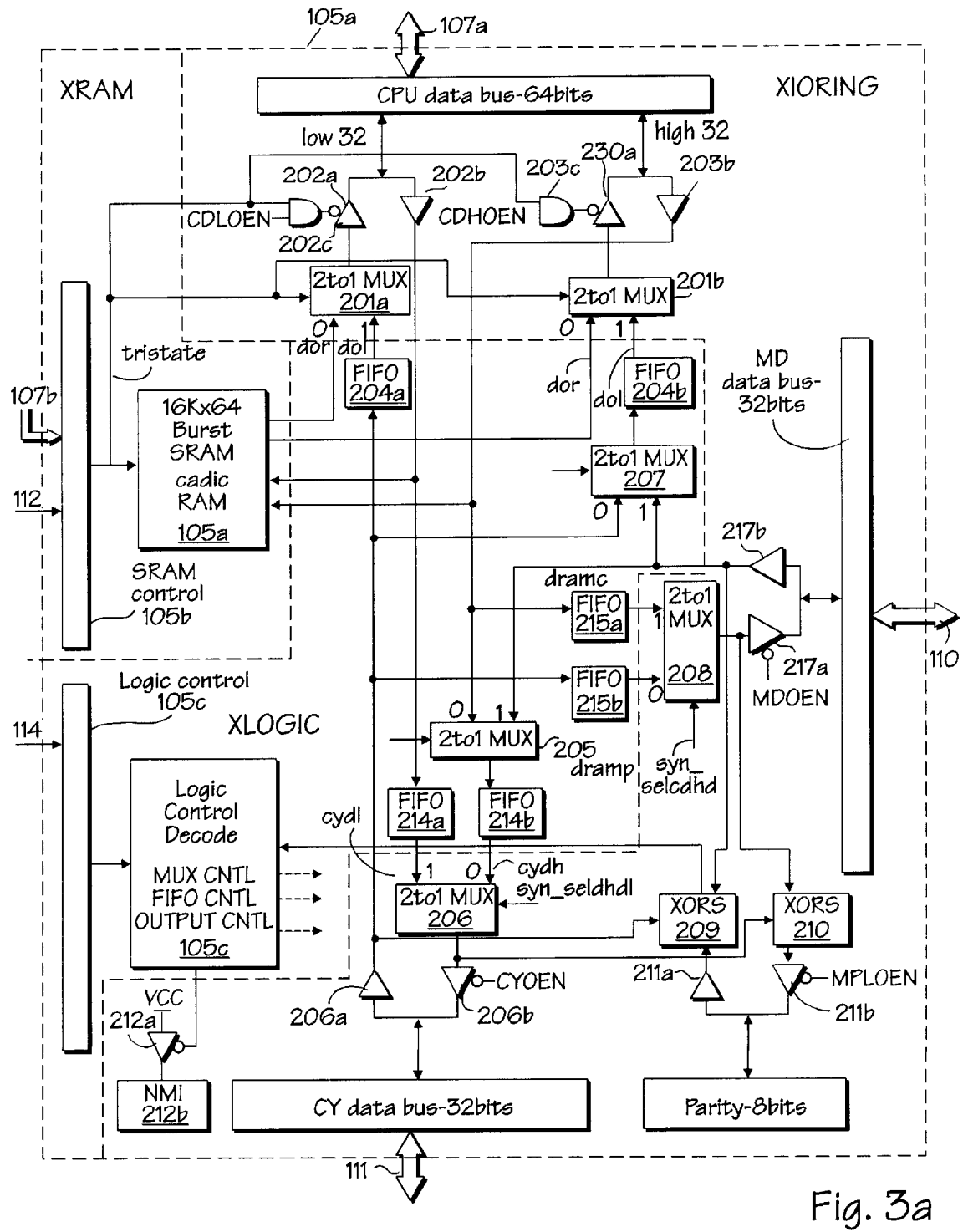
FIG. 3a shows a particular embodiment of an integrated circuit of the present invention.

FIG. 2 shows an embodiment of a computer system according to the present invention. In this system, a microprocessor 101 is coupled to a processor bus 102. The processor bus is coupled to two integrated circuits 103 and 105. A plurality of DRAM integrated circuits 109 are coupled to the two integrated circuits 103 and 105 in order for the DRAM to communicate with the processor bus and the PCI bus 115. The microprocessor 101 may be a conventional microprocessor, such as a Pentium microprocessor from Intel Corporation of Santa Clara California and the processor bus 102 may be a typical bus, such as a processor bus with the Pentium microprocessor. Chips or integrated circuits 103 and 105 provide functions which are similar to conventional core logic chipsets which provide the glue logic and control for a modern computer system. Thus, IC 103 includes a microprocessor interface 103a which is coupled to the processor bus 102 to receive address and control signals. IC 103 also includes a tag RAM 103b and a level 2 cache control 103d for interfacing with the cache array 105a on the chip 105. Signals between the level 2 cache control 103d and the SRAM control unit 105b are conveyed via lines 112. The interface between chips 103 and 105 is performed by two control interface units 103e and 105c which are coupled by lines 114. The interface between the processor bus and the Peripheral Component Interconnect (PCI) bus is controlled by the PCI interface unit 103c, which provides standard, conventional PCI control functionality and allows the microprocessor and the DRAM and the cache array to receive and send information to components coupled to the PCI bus or to components coupled to the Industry Standard Architecture (ISA) bus 125. The IC 103 also includes a FIFO 103f which is used to couple data from the bus 111 or to the bus 111. For example, First-In-First-Out (FIFO) 103f may be used when transferring data from the DRAM 109 or the SRAM cache array 105a to a component on the PCI bus. Conventional DRAM control is provided by the DRAM control unit 103g which is coupled via control lines 106b to the DRAM 109. As shown in FIG. 2, DRAM 109 receives address signals from the processor bus 102 via interconnect 106a through IC 103. FIFO 103f receives or sends data to FIFO 105d on the IC 105. FIFO 105d is coupled to a 32 bit bus 111 which is also referred to as a "lower 32 bit memory (CY) data bus" which typically carries the lower 32 bits of data. The DRAM 109 is also coupled to this bus as well as to the 32 bit bus 110 which is also referred to as the "upper 32-bit memory (MD) data bus" which typically carries the higher 32 bits of data. FIFO 105e on the single semiconductor substrate (IC) 105 interfaces between the SRAM cache array 105a, as shown in FIG. 3a, and the DRAM 109.

The computer system shown in FIG. 2 includes several conventional components coupled to the PCI bus 115, such as the graphics controller 119, the SCSI controller 121 and a local area network (LAN) controller 123. It will be appreciated that the graphics controller 119 controls a CRT 120, while the SCSI controller 121 controls a peripheral device, such as a hard disk 122. The LAN controller 123 is used to couple the computer system to a network 124. Also coupled to the PCI bus 115 is a control chip 117 which controls peripheral units for the computer system and interfaces between the PCI bus 115 and the ISA bus 125.

Figure 1A:
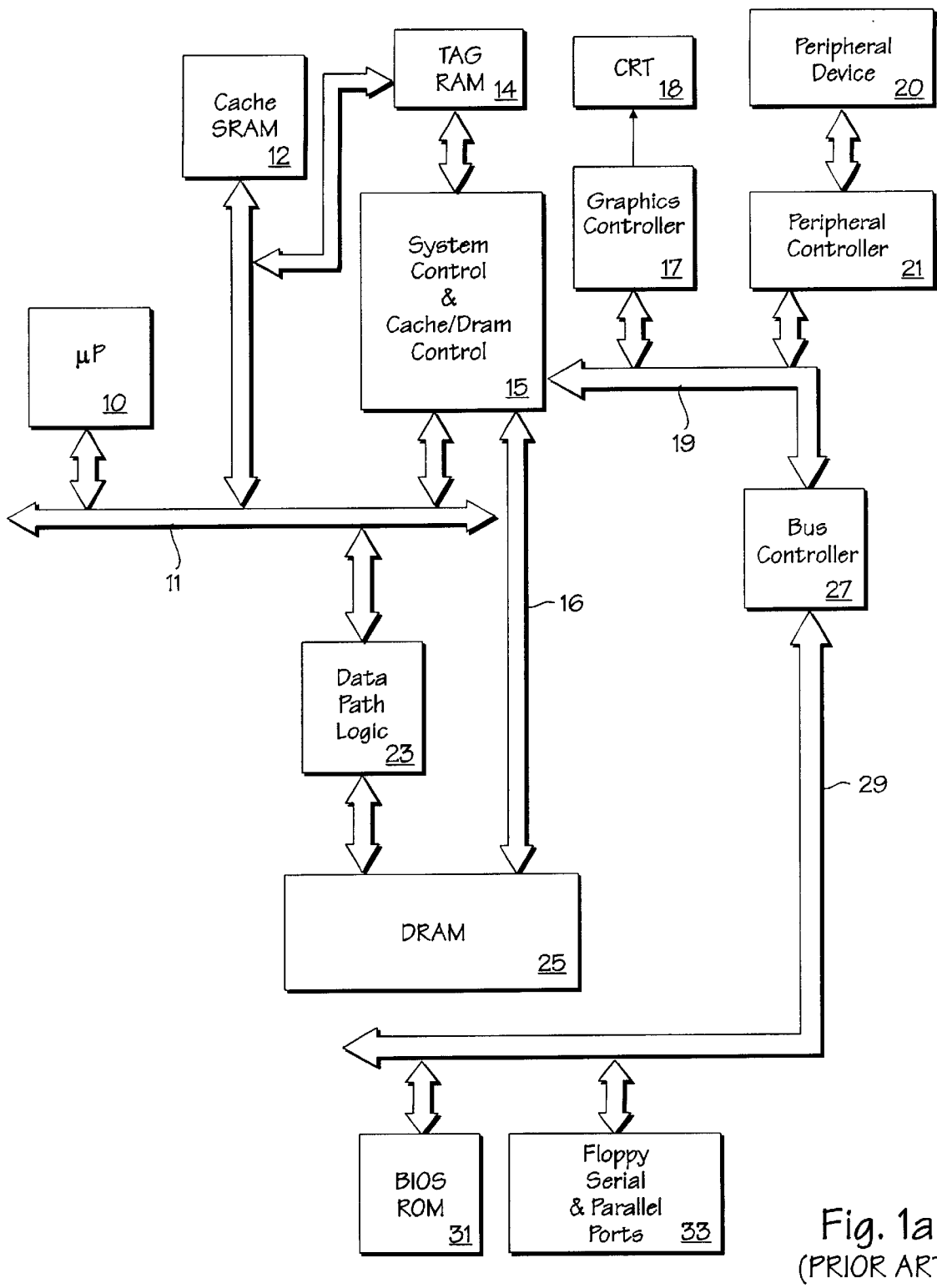
FIG. 1a illustrates a prior art computer system which employs a cache SRAM array.
Figure 1B:
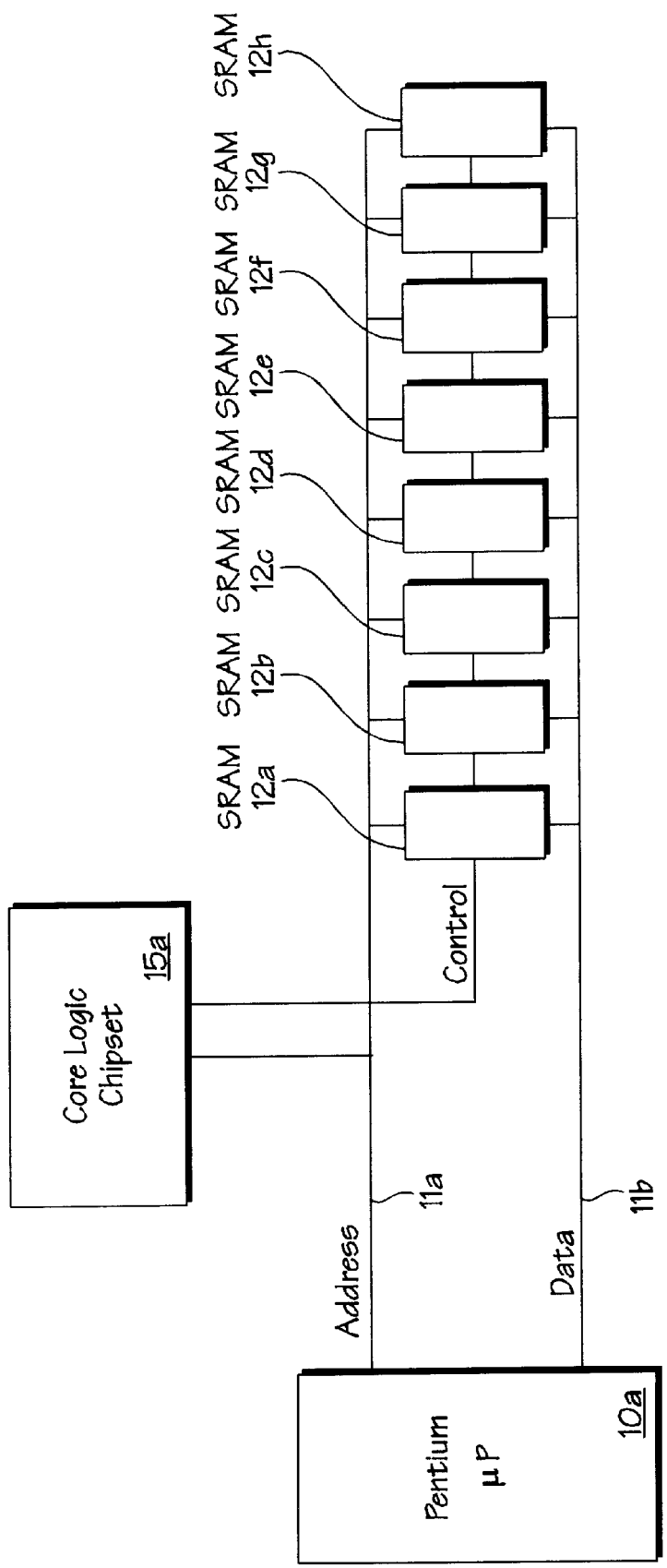
FIG. 1b illustrates a portion of a computer system in the prior art which employs SRAM cache.

It will be appreciated that the ISA bus 125 is similar to the bus 29 shown in FIG. 1a and the IC 117 is similar to the bus controller 27 shown in FIG. 1a. IC 117 includes a timer counter 117b and a PCI interface unit 117a which interfaces components and data to and from the PCI bus. Also, on the IC 117 is logic to control the keyboard and mouse, which logic unit 117c is coupled to the keyboard and mouse. A clock generator 117j provides clock signals for internal time keeping or may be used to clock other components. A FIFO 117e may be used for DMA transfers and other data transfers between the ISA bus and the PCI bus and components thereon. The IC 117 also includes a interrupt controller for processing interrupts and a DMA controller 117f for performing DMA operations, such as a direct memory access operation from the floppy disk coupled to the floppy disk port 127 on the ISA bus 125 to the DRAM 109. An ISA interface unit 117g provides interface for data transfer operations between the ISA bus and the PCI bus. The IC 117 further includes the power management unit 117h for performing well known power management operations in order to conserve power consumption by the computer system. The IC 117 also includes an IDE control unit 117i which may be used to couple peripheral devices such as IDE hard disks to the computer system.

The IC 103 includes a level 2 cache control 103d which supports a look aside (parallel) cache array with synchronous or pipelined burst SRAMs, such as the SRAM cache array 105a. A tag RAM 103b also located on the integrated circuit 103 (specifically on a single semiconductor substrate which contains the integrated circuit 103) can be configured to either a direct map or a multi-way set associative tag RAM. Bus concurrency is supported between the microprocessor 101 and the cache 105a and the DRAM 109 and PCI bus 115 by using the FIFOs in FIG. 2 to store the pre-read and post write data. In one embodiment of the present invention, the cache control 103d along with the SRAM control 105b supports a high performance write back/write through cache controller with the integrated tag SRAM 103b and with first and second level cache coherency mechanisms. As noted above, the tag RAM is either a multi-way associative or direct mapped and can be configured either to support write-back (with an operational dirty bit in the tag) or write-through write policies.

It will be appreciated in this particular embodiment that the SRAM cache array is a single port look aside cache; in an alternative embodiment, a flow through or multi-port cache may be provided at additional cost.

As described further below, the IC 105 provides data steering to and from three different interfaces, including the processor bus 102, and MD data bus 110 and the CY bus 111 in addition to providing an integrated SRAM cache array. The FIFOs 105d and 105e serve as a pre-reading and post-writing buffers and are controlled by signals provided by the IC 103 (e.g. control signals CNT 11:0) shown in FIG. 9a. The pre-reading and post-writing feature enhances system performance by allowing concurrent transactions on the processor bus 102, the PCI bus 115 and the DRAM buses 111 and 110.

FIG. 3a shows various components within the IC 105. For purposes of illustrating the functional components, the IC 105 has been segmented into three sections referred to as the XRAM, the XIORING and the XLOGIC section. These sections also correspond to the chip layout shown in FIG. 4 which will be described below. The XRAM section includes a SRAM control unit 105b and the SRAM cache array 105a. The SRAM control unit 105b receives address signals from the processor bus on interconnect 107b and also receives control signals off interconnect bus 112 from the level 2 cache control unit 103d in the IC 103. The XLOGIC section includes a plurality of FIFOs and multiplexers as well as a logic control unit 105c which receives signals from the bus interconnect 114 from the IC 103. Also included within the XLOGIC section are various buses which interconnect buses 110 and 111 to the processor bus's data bus through the interconnect 107a. The XIORING section includes the interfaces to the processor's data bus as well as to MD data bus and the CY data bus and includes on chip drivers as well as several two to one muliplexers, such as the two to one muliplexers 201*a* and 201*b* which received inputs from the SRAM cache 105*a* and the data buses 110 and 111.

The logic control decode unit 105*c* provides the various control signals to the muliplexers, FIFOs and output controls in order to provide a data path between the memory buses 110 and 111 and the processor's data bus 107*a*. One feature the logic control unit 105*c* provides is parity checking by receiving optional parity bits and performing conventional parity checks by utilizing the exclusive OR gate 209 which provide the result of the parity check back to the logic control unit 105*c*. If the parity check shows a data error has occurred, the processor is notified by a non maskable interrupt driven by the driver 212*a* through the interface 212*b*. The exclusive OR gate 210 provides parity generation for writes into the DRAM 109.

Figure 3B:
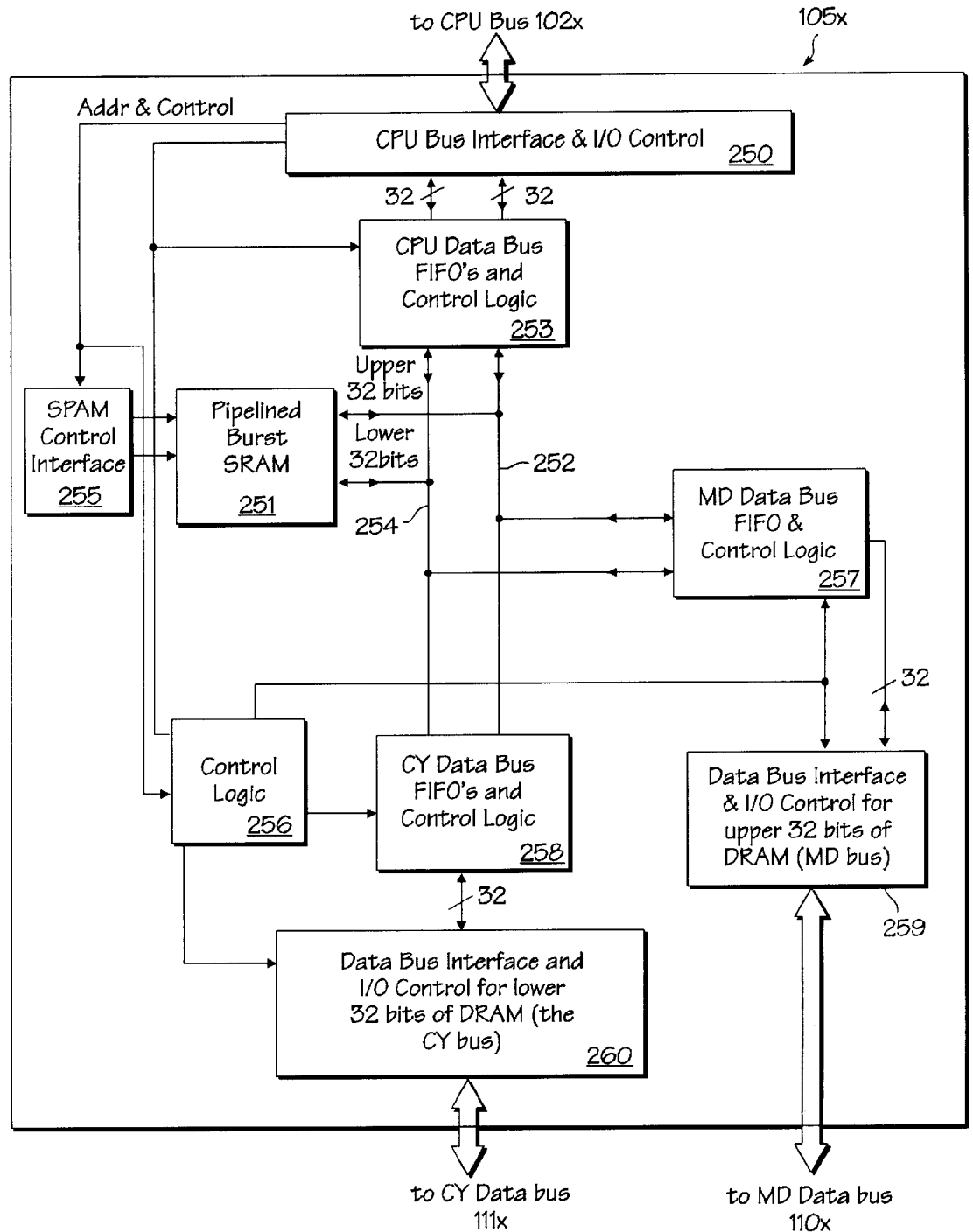
FIG. 3b provides another illustration of an integrated circuit of the present invention.

The operation of a computer system containing the IC 105 will now be described in order to illustrate the data path management and control of the IC 105. When the microprocessor 101 needs data, its sends an address over the processor bus 102, and this address is received by the microprocessor interface unit 103*a* and compared to addresses in the tag RAM directory maintained in the tag RAM 103*b*. If there is a match, this indicates a cache hit, meaning that the cache contains the data requested by the processor. In this instance, the address of the data requested is provided over bus 107*b*, which is the address portion of the processor bus 102, to the SRAM control unit 105*b* and the data from the SRAM cache array 105*a* is provided over two buses shown in the XLOGIC section into muliplexers 201*a* and 201*b* which have been switched to accept the input zero of these multiplexers thereby allowing data from the SRAM cache to be sent to the drivers 202*a* and 203*a* thereby driving the data from the SRAM array onto the CPU data bus via interconnect 107*a*. If the data requested by the processor is not stored in the cache array (a cache miss), as indicated by checking the address stored in the directory of the tag RAM 103*b*, then the data is retrieved from the DRAM 109 by providing the address over bus 106*a* to the DRAM 109 which then drives data onto buses 110 and 111 through drivers 217*b* and 206*a* respectively into the data path logic of the IC 105. Because there is a cache miss in this instance, the muliplexers and FIFOs will be switched to accept data from the buses 110 and 111 rather than from the SRAM cache array. Consequently, the lower order bits on bus 111 will be driven via driver 206*a* into the FIFO 204*a* and through the multiplexer 201*a* and then through driver 202*a* and then to the lower 32 bits of the processor's data bus 107*a*. At the same time, the higher order of 32 bits will be driven from DRAM 109 through interconnect bus 110 and through driver 217*b* into the multiplexer 207 and through the FIFO 204*b* and then the multiplexer 201*b* and then driver 203*a* which has been enabled and then onto the high 32 bits of the processor's data bus 107*a*. In this manner, when a cache miss occurs the data is driven from the DRAM 109 back to the processor through the processor bus 102. In the embodiment shown in FIG. 3*a*, there is no direct connection on the IC 105 back to the SRAM cache array when a cache miss occurs as described, and consequently the IC 105, when a cache miss as described occurs, will cause the SRAM cache array to read the processor bus 102 when the data from the DRAM 109 is driven onto the processor bus 102 so that the cache 105*a* may be updated with data retrieved from the DRAM 109. FIG. 3*b* shows an alternative embodiment, wherein the SRAM cache may receive data directly on chip during a cache miss read from DRAM 109.

The writing of data from the microprocessor 101 through the processor bus 102 and to either the cache or the DRAM or both is performed in a conventional manner through the data path shown in FIG. 3*a*. For example, in a write through mode, the processor 101 drives data onto the processor bus 102 and 107*a* into the IC 105 and this data is driven by drivers 202*b* and 203*b* into the SRAM array 105*a* and also into FIFOs 214*a* and 215*a*. The data from these FIFOs 214*a* and 215*a* is then driven into multiplexer 206 and 208 respectively which is then driven by drivers 206*b* and 217*b* respectively onto buses 111 and 110 respectively. In this fashion, data from the processors convey to both the SRAM array 105 and to the DRAM 109 through buses 111 and 110. It will be appreciated that the writing in a write through mode will occur to the cache only when there is a cache hit as determined by the comparison of the entries in the tag RAM 103*b* with the address provided by the processor 101. If there is a cache miss in this instance, only the memory in DRAM 109 is updated.

The data path logic incorporated on the IC 105 includes logic which routes data to and from the MD data bus 110 and the CY data bus 111. This functionality allows transfers between the DRAM 109 and the PCI bus, which typically has a 32 bit data bus, and its components. In particular, when a transfer between the DRAM 109 and PCI bus is required (e.g. the frame buffer in graphics controller 119 requires data from the DRAM 109), this data is provided in a time division multiplexed manner by receiving, in one embodiment, a first 32 bits from a DRAM 109 through the CY data bus 111 into the FIFO 103*f* and through the PCI interface 103*c* and then a second 32 bits from the DRAM 109 through bus 110 onto the IC 105 and through the driver 217*b* into the multiplexer 205 which has been selected to select input 1 thereby driving the data from the bus 110 into the FIFO 214*b* and out through multiplexer 206 (selected with input zero) through the driver 206*b* and onto the CY data bus 111 which is coupled to FIFO 103*f* in IC 103. This FIFO 103*f* then conveys the data through the PCI interface 103*c* onto the PCI bus 115. In a data transfer from the PCI bus to DRAM 109, the multiplexer 208 is used (when so selected) to transfer data from the CY data bus 111 to the MD data bus 110. This multiplexer 208 has an input coupled, through FIFO 215*b*, to the CY data bus 111 and has an output coupled, through driver 217*a*, to the MD data bus 110. The other input of multiplexer 208 is coupled, through FIFO 215*a*, to the higher 32 bits of the processor bus 107*a*. This multiplexer 208 is used, when input zero is selected, to transfer data from the PCI bus 115 to the MD data bus 110. This transfer occurs in the following manner. The PCI bus provides the first (lower) 32 bits of data to the PCI interface 103*c* which then provides the data, through FIFO 103*f*, to the bus 111 and into the DRAM 109 (under control of the DRAM control 103*g* which provides conventional address and control signals to latch the data into the DRAM 109). Then, the PCI bus provides the second (higher) 32 bits of data to the PCI interface 103*c* which then provides the data, through FIFO 103*f*, to the bus 111 and into the FIFO 215*b* (via driver 206*a*) and through multiplexer 208 (which has its input zero selected) to the bus 110 (through driver 217*a*) and then into DRAM 109. It will be appreciated that each mutliplexer shown in FIG. 3*a* performs a function of selectively routing a group of signals, and that numerous implementations of multiplexers can be used, including for example a cross-bar switch.

FIG. 3*b* shows an embodiment of an integrated cache array and data path logic on an single semiconductor substrate integrated circuit 105*x*, which is similar to the IC 105 shown in FIG. 3a. In this embodiment, a read from DRAM via memory buses 111x and 110x when there is a cache miss will cause the SRAM array 251 to be updated directly on chip rather than having the SRAM read the data driven onto the processor bus 102x from the memory buses 110x and 111x. This occurs via the bidirectional buses 252 and 254 which are both coupled to the SRAM array 251. The SRAM array 251 is coupled to receive control signals from an SRAM control interface 255 which itself receives address and control signals from the CPU bus interface and I/O (input/output) control unit 250. Control unit 250 is coupled by 2 32 bit data buses to the CPU data bus FIFOs and control logic 253. This control logic 253 is coupled to the MD data bus FIFO and logic control unit 257 and the CY data bus FIFO and control logic unit 258 via 2 bidirectional on chip buses 252 and 254. A control logic unit 256 controls the operation of the FIFOs and multiplexers and controls the interfaces with the memory buses 111x and 110x as well as controlling the interaction with the CPU bus 102x.

Figure 4:
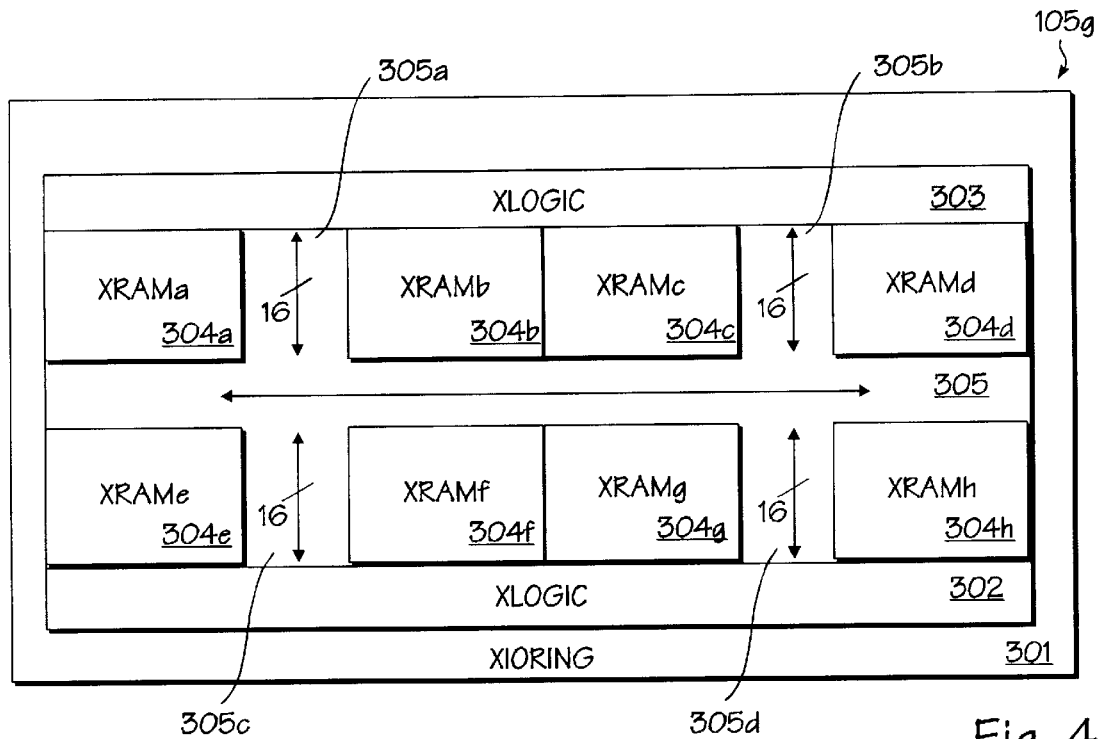
FIG. 4 shows a layout of one embodiment of an integrated circuit of the present invention; this layout illustrates the manner in which the various functional components may be placed on a semiconductor substrate according to the present invention.
Figure 10:
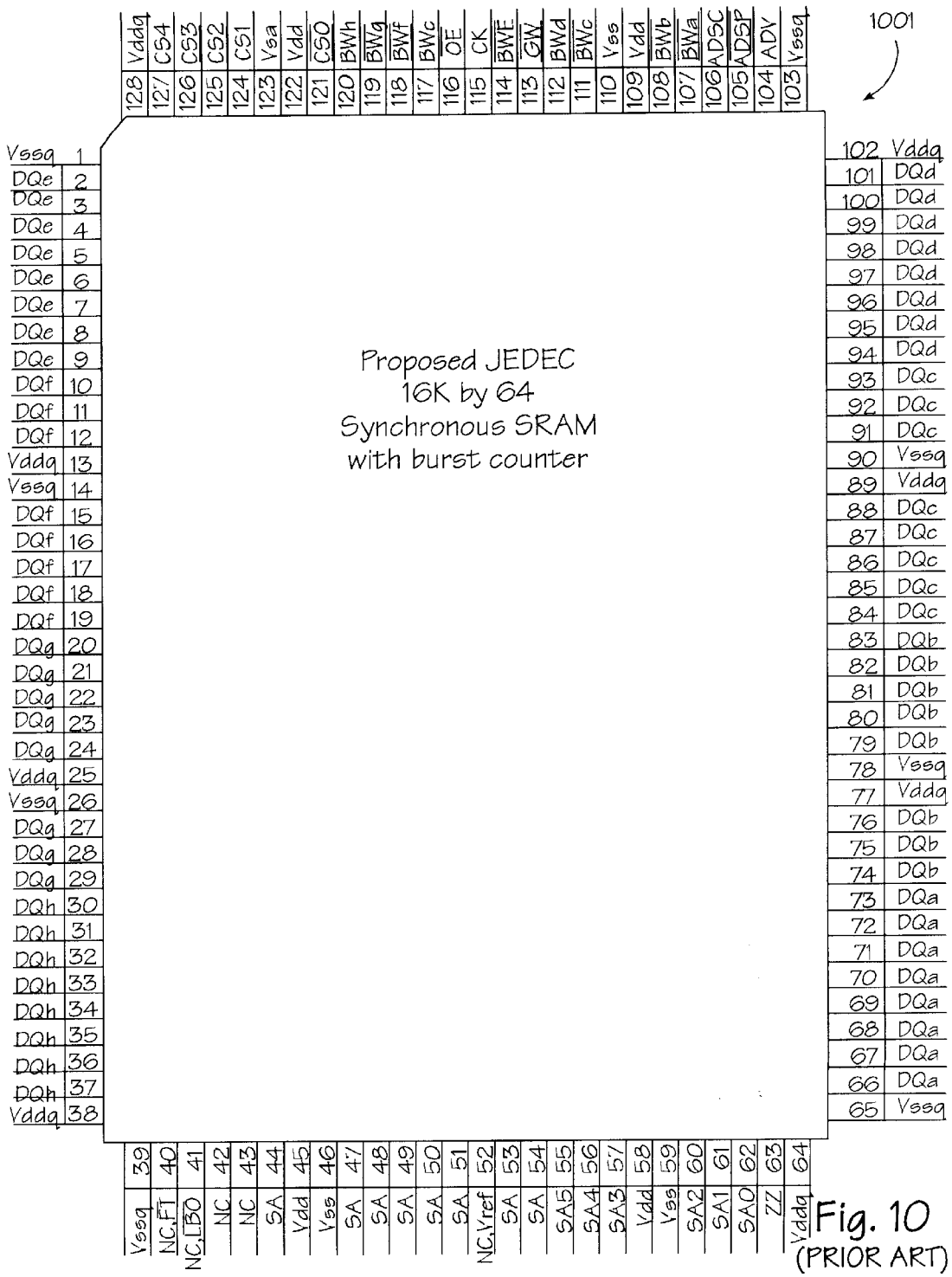
FIG. 10 illustrates a prior art configuration for a SRAM.

FIG. 4 shows a layout on a semiconductor substrate 105 Q which represents the IC 105. The three sections of IC 105 are shown in FIG. 4 as X LOGIC, XIORING, and XRAM (in eight sections, XRAMa through XRAMh, labeled 304a through 304h). There are two rectangular XLOGIC sections 302 and 303 which flank the 2 rows of SRAM sections as shown in FIG. 4. The XIORING 301 forms a rectangular ring around the XLOGIC sections and the 8 XRAM sections. The two rows of XRAM are separated by an area 305 which contains a plurality of the buses used to interconnect and route the data and each row includes two areas to allow routing of buses for data being conveyed to and from the SRAM cache array. In particular, the row with XRAM 304a through 304d includes two areas 305a and 305b for buses on the semiconductor (e.g. silicon) semiconductor IC to the XLOGIC and XIORING sections. Similarly, the row of XRAM containing the four SRAM sections 304e through 304h include two areas 305c and 305d for routing buses between the array and the XLOGIC and XIORING sections. As will be described in further detail below, the present invention incorporates these novel layout features with an interleaving of the input/output pads which connect the IC 105 or 105q to the CPU data bus and to the memory data bus, such as memory data buses 110 and 111. This interleaving of the pads of the periphery of the IC, typically in the XIORING section along with the novel layout shown in FIG. 4 provides for minimization of the metal routing inside the IC. Furthermore, the pin placement on the IC as described below provides maximum performance of the ground/power pinout interaction. This interleaving also allows using the IC 105 as an expansion cache, (e.g. expansion cache 111 in FIG. 11) without changing the die and still be consistent with certain pinout configurations, such as that shown in FIG. 10.

Figure 5:
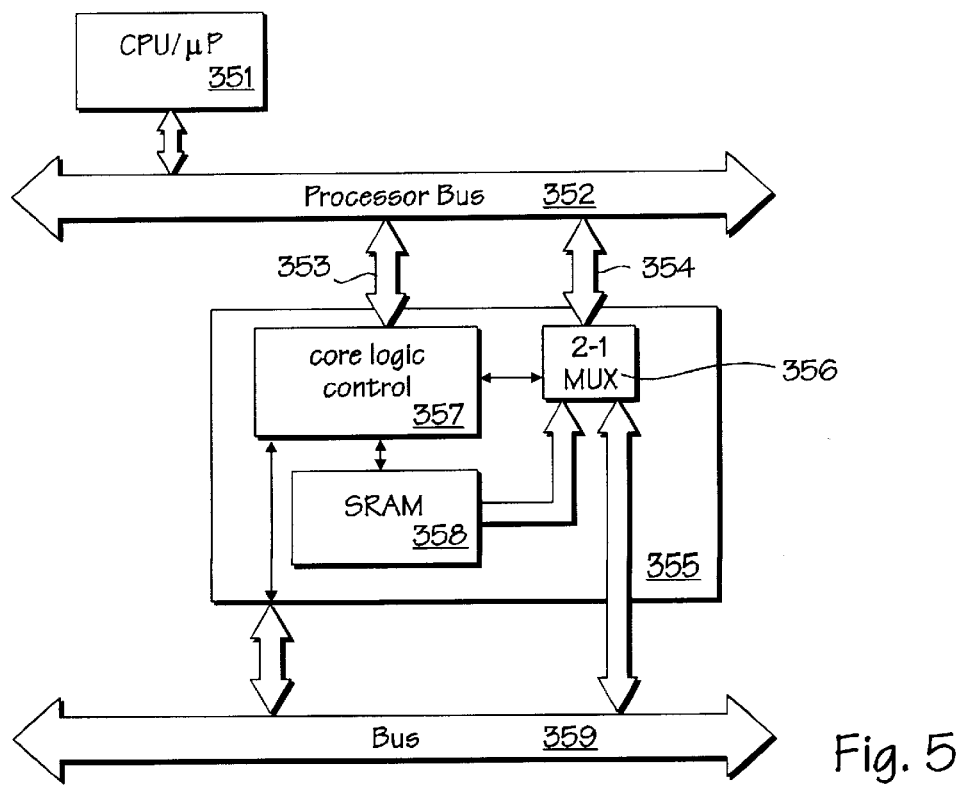
FIG. 5 illustrates an aspect of the present invention.

FIG. 5 illustrates a particular aspect of the present invention wherein a two to one multiplexer serves as a data path logic unit between a memory bus 359 and the processor bus 352. As shown in FIG. 5, the microprocessor 351 is coupled to the processor bus 352 which is itself coupled to a chip such as chip 355 which is similar to the IC 105 in that it contains the SRAM cache 358 as well as a data path control unit including the multiplexer 356 and the core logic control for controlling the multiplexer 357. The data bus is coupled to the multiplexer 356 via an interconnect 354 to the processor bus 352, and the address and control bus of the processor bus is coupled via interconnect 353 into the control logic unit 357. The memory bus 359 is coupled to DRAM memory to provide addresses and control signals to the DRAM and data to and from the DRAM.

It will be appreciated that the multiplexer 356 is similar to the multiplexers 201a and 201b shown in FIG. 3a and provide for multiplexing between the SRAM cache 358 and data from the memory bus 359.

Figure 6A:
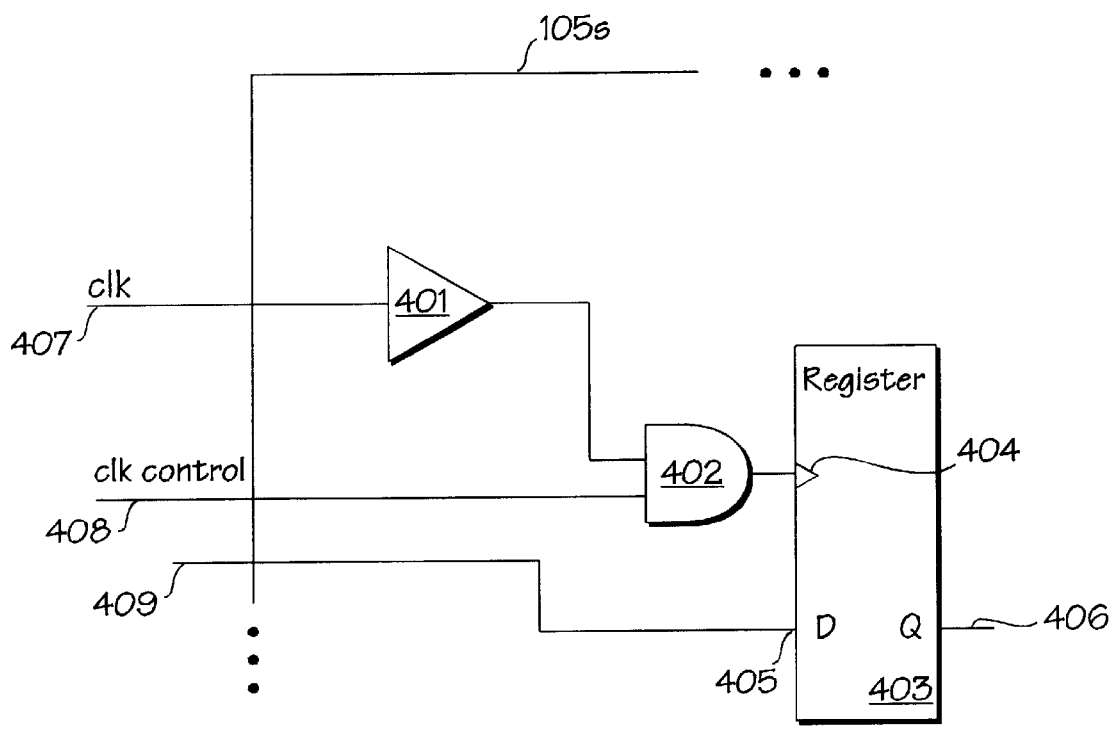
FIG. 6a illustrates a portion of an integrated circuit of the present invention which provides for logic to stop clocking operations for the SRAM cache memory of the present invention.
Figure 6B:
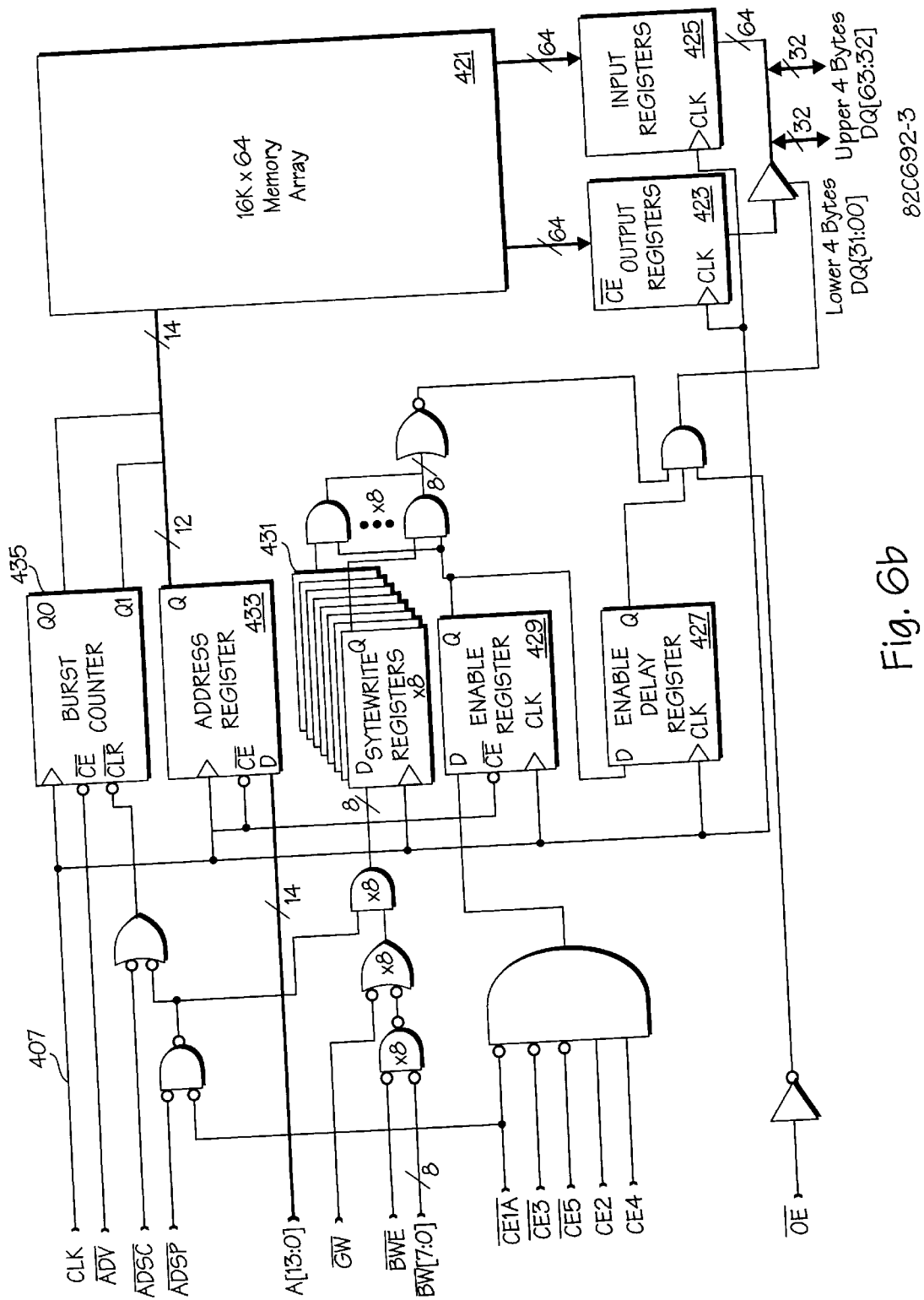
FIG. 6b shows in more detail the functional units of an SRAM cache incorporated on an IC of the present invention.

FIG. 6a shows another aspect of the present invention. In one embodiment, clock control logic may be incorporated onto the IC 105 or coupled to the IC 105 in order to control the clocking operations of the synchronous SRAM which may be disposed on the IC 105. It is contemplated that in the preferred embodiment, the SRAM will be synchronous SRAM rather than asynchronous SRAM. Synchronous SRAM requires numerous clocking signals, typically supplied to various registers as shown in FIG. 6b. FIG. 6b represents the internal logic and array of the SRAM cache array, such as the array 105a shown in FIG. 2 and shown in FIG. 3a. These registers typically receive a clock signal in order to control the operation of the SRAM in a conventional manner. For example, address signals are clocked into the address registers and the output registers receive clock signals which are designed to provide proper latching of data after the addresses have been propagated into the array 421. In prior art computer systems, it has not been practical to stop clocking operations of cache array due to the fact that other components on the printed circuit board of the computer system are often affected by stopping the clocking operations; that is, stopping the clock signal such that the normal square wave clock signal is no longer provided, typically prevents the proper functioning of various clock components on the computer system. However, according to the present invention it is possible to stop the internal clock provided to the various registers of the SRAM array without destroying the data on the SRAM array (since it is a static array) without affecting other components on the printed circuit board. This is achieved as shown in FIG. 6a by incorporating clock control logic such as AND gate 402a and a driver 401 on the IC 105, which is shown in a representative portion shown as 105f in FIG. 6a. The clock signal from the printed circuit board or other platform containing the IC 105 is provided by connection 407 into the buffer/driver 401 the output of which is coupled to one of the inputs of the AND gate 402. A clock control logic signal which may be provided by the IC 103 is provided at connection 408 and is also an input to the AND gate 402. The output of the AND gate 402 is coupled to the clock input 404 of a representative register 403. It will be appreciated that this representative register may be any one of or all of the various registers shown in FIG. 6b, including registers 423, 425, 427, 429, 431, 433 and 435. It is appreciated that each register, such as representative register 403 includes the data input connection 405 and the data output connection 406. It will be appreciated that the clock control signal in connection 408 may be provided by the IC 103 under software control or other well known power management control schemes which monitor user activity or other activities in the computer system and attempt to conserve power. In this embodiment, power may be conserved by stopping the clock signal from driving the various registers associated with the SRAM cache array on the IC 105.

Figure 7:
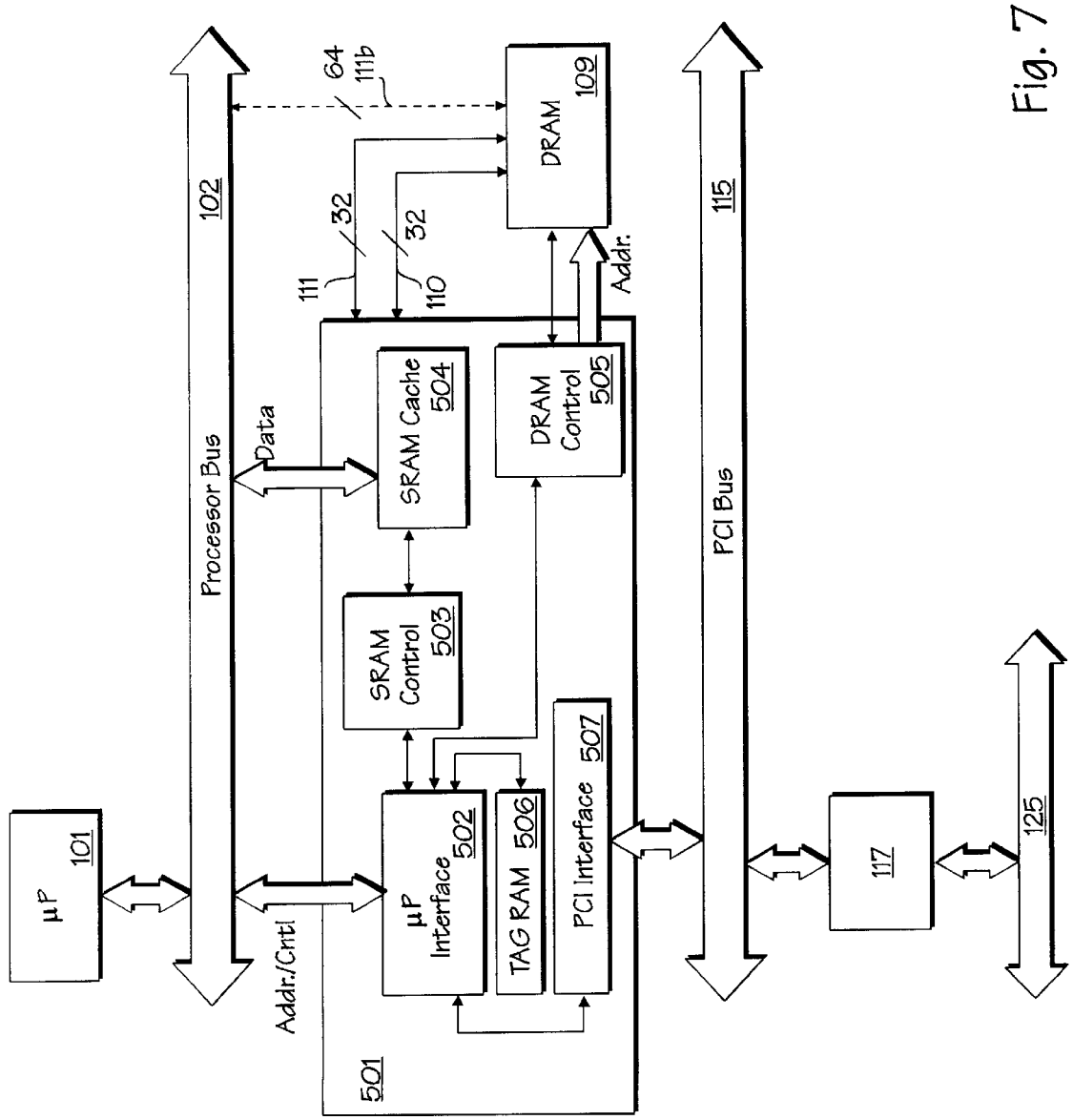
FIG. 7 shows an alternative embodiment of the present invention in a computer system.

FIG. 7 shows an alternative embodiment of the present invention wherein the computer system shown in FIG. 7 includes a single IC 501 which provides the functionality of the two ICs 103 and 105. Thus, the IC 501 contains on a single semiconductor (e.g. silicon) substrate a microprocessor interface 502 and a tag RAM 506 which is coupled to the processor interface 502. It will be appreciated that a comparator for the tag RAM is incorporated on the IC 501, typically in the microprocessor interface unit 502, in order to compare addresses obtained from the processor bus with addresses stored in the directory of entries in the tag RAM 506. A PCI interface unit 507 is coupled to the interface unit 502 to transfer information between the processor bus and the PCI bus as with the embodiment shown in FIG. 2. An SRAM control unit 503, in communication with the processor interface unit 502 and the SRAM cache 504, controls the operation of the SRAM cache. Similarly, the DRAM control unit 505, which is similar to the DRAM control unit 103g, controls the DRAM operations, including refresh and reading and writing operations which are required for DRAM. A DRAM 109 is shown coupled to the DRAM control unit 505 and receives addresses from the processor bus 102 and has data buses 110 and 111 coupled to the IC 501 to provide the high order and low order bits of the memory data bus. Alternatively, the memory data bus may be directly coupled to the processor bus 102 via the dashed bus line 111b. As with the embodiment shown in FIG. 2, a PCI bus 115 and an expansion bus 125 are provided in the computer system and the interface between these two bus systems is provided by an interface unit 117.

Figure 8:
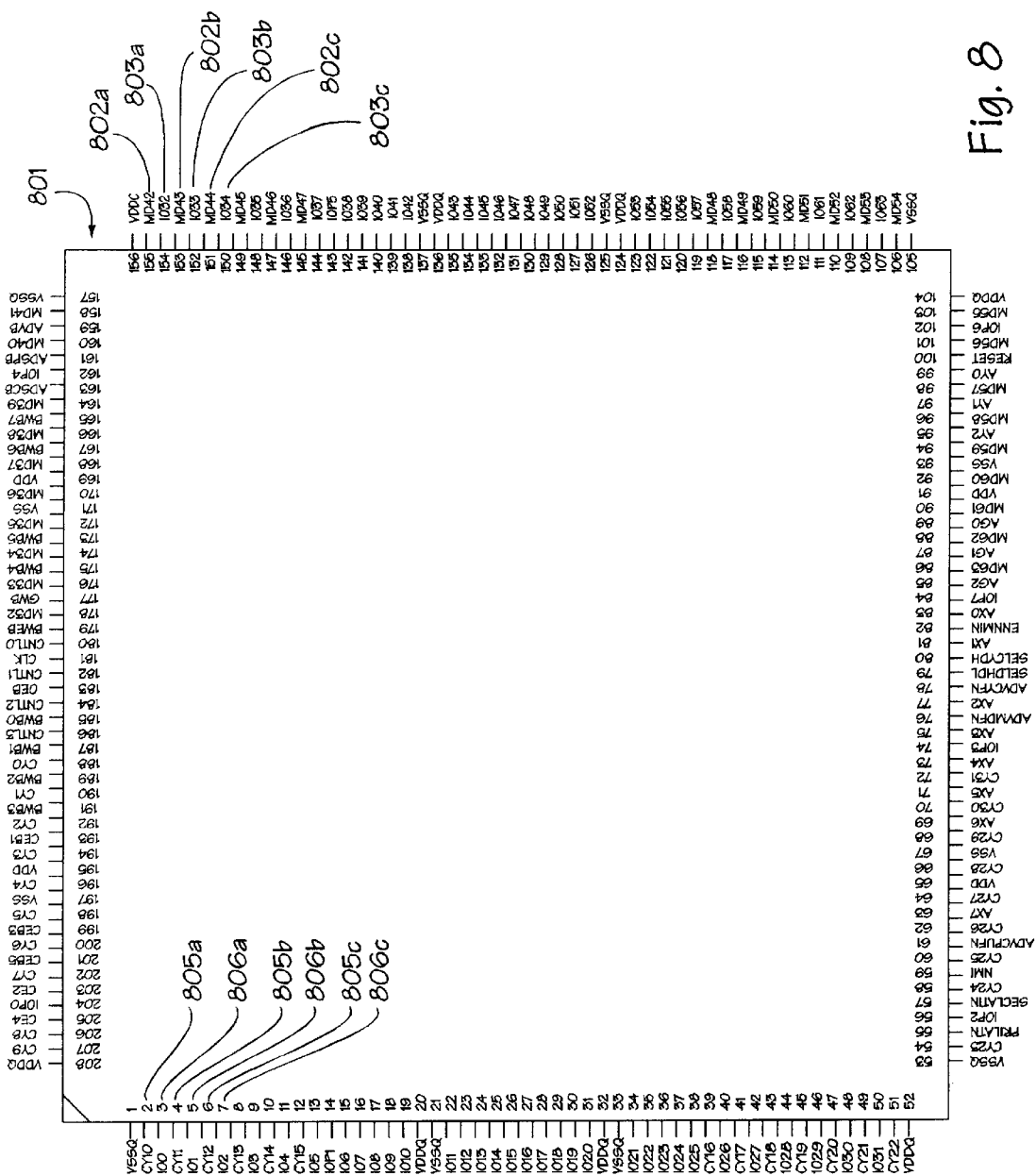
FIG. 8 shows the pinout patterns, with interleaving, for an integrated circuit of the present invention which includes a cache array with system logic control.

As noted above the invention provides a unique pad and interconnect layout when an IC such as IC 105 incorporates a cache array as well as control logic such as data path control logic and data paths between the processor bus and the memory buses. FIG. 8 illustrates a particular embodiment of the present invention wherein the pads on the integrated circuit 801, which represents the IC 105, are shown with their signals identified around the periphery of the integrated circuit. The designation I/O represents the processor data bus 107a while the designation CY represents the CY data bus 111 and the designation MD represents the MD data bus 110. As can be seen from FIG. 8, the pads on IC 801 which are used for connections between the processor data bus and the IC 801 are interleaved with the pads and interconnections for the CY data bus 111 as shown on the left side of FIG. 8. Similarly, other pads and interconnections from the processor data bus 107a are interleaved with pads and interconnections for the MD data bus 110 as shown on the right side of FIG. 8. For example, pads on the periphery of the IC 801 for the CY data bus, including pads represented by reference numerals 805a, 805b, and 805c are interleaved along the linear row on the left side of the IC with pads for the processor bus, shown as reference numerals 806a, 806b, and 806c. Similarly, on the right side, pads disposed in a linear row shown as pads 802a, 803a, 802b, 803b, 802c, and 803c illustrate the interleaving between pads of the MD data bus 110 and the portion of the processor bus 107a. In particular, some of the pads for the interconnect for the MD data bus 110, such as pads 802a, 802b, and 802c are interleaved with some of the pads for the interconnect with the processor bus 107a, and particularly pads 803a, 803b, 803c.

This interleaved configuration improves the metal routing on the IC 105 particularly when the layout shown in FIG. 4 is utilized in accordance with the present invention. This interconnect layout shown in FIG. 8 also improves the ground and power interface on the chip in a manner which is consistent with known proposals such as that shown in FIG. 10.

Figure 9A:
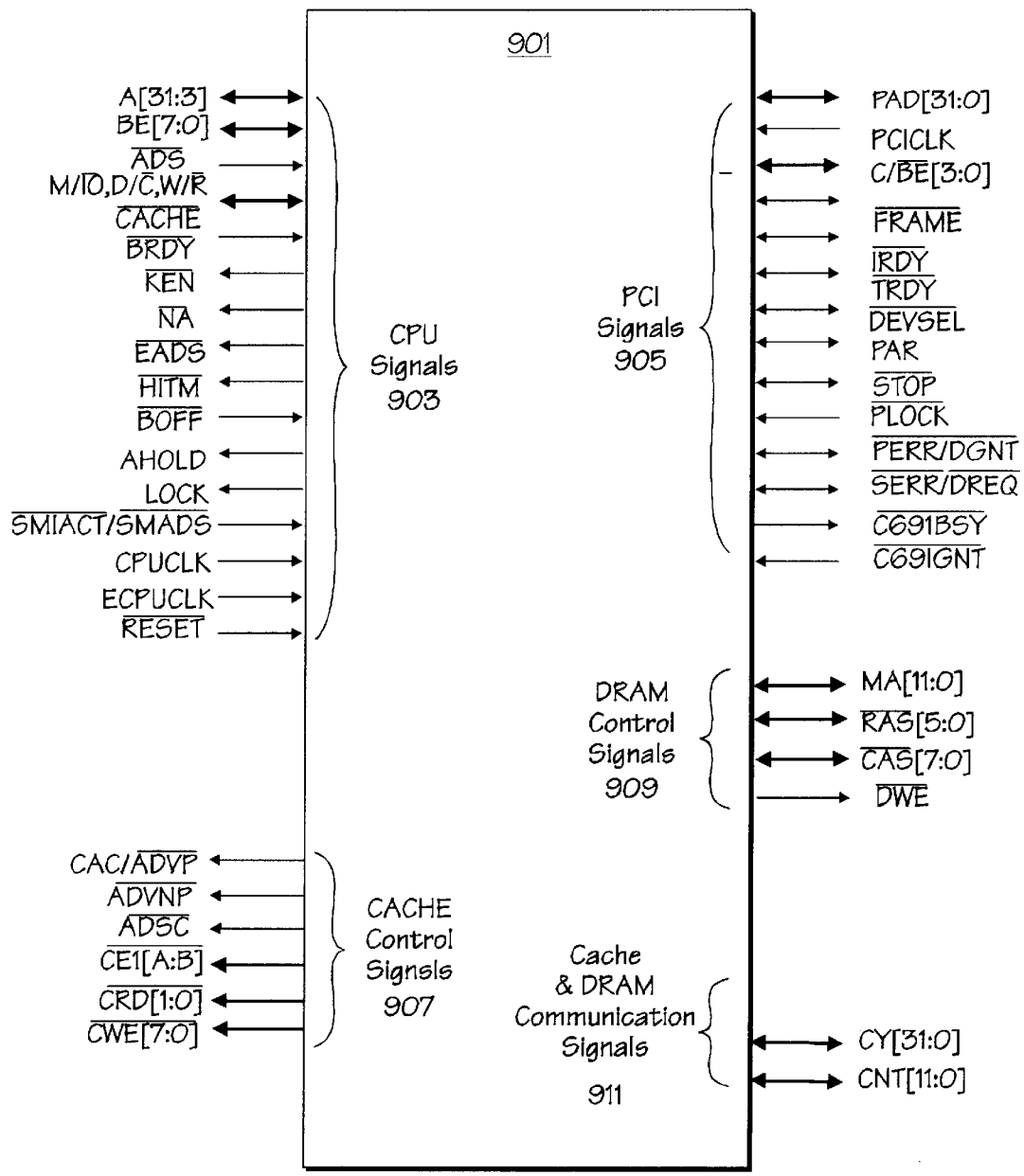
FIG. 9a shows the various signals inputted and outputted to a particular integrated circuit of the present invention.
Figure 9B:
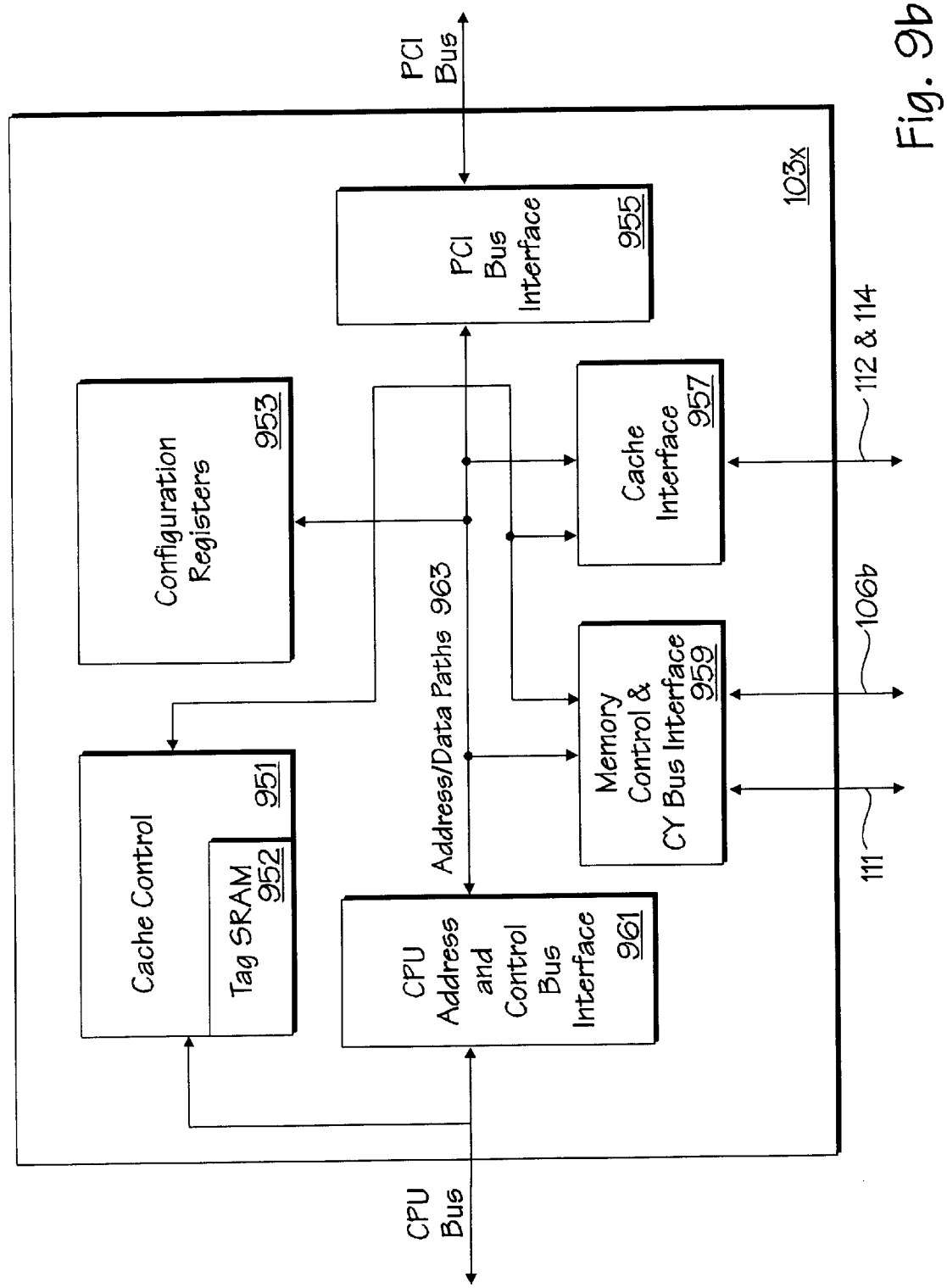
FIG. 9b shows the logical blocks within an integrated circuit of the present invention.

FIG. 9a and 9b show aspects of the IC 103. In particular FIG. 9a illustrates the various signals to and from the processor bus and the PCI bus as well as the control signals for one embodiment of the present invention, such as the embodiment shown in FIG. 2. FIG. 9b illustrates various functional blocks and the interconnection between those functional blocks which are contained in an IC such as IC 103. Included with an IC 103x shown in FIG. 9b is a cache control unit with its associated tag RAM 952. This cache unit 951 is coupled to control the cache interface 957 and the memory control and CPU bus interface 959. A CPU address and control bus interface 961 is coupled to the CPU (processor) bus which provides control signals to both the unit 961 as well as the cache control unit 951. The cache control unit 951 includes a comparator which compares addresses from the CPU bus to addresses stored in the tag SRAM 952 in order to perform a determination of whether there is a cache hit or miss. An address and data path bus 963 is provided within the IC 103x in order to interconnect the various components as shown in FIG. 9b. For example, the interconnect bus 963 interconnects the interface unit 961 with he PCI bus interface unit 955, which itself is coupled to the PCI bus. The cache interface unit 957 is coupled to the chip 105 through buses 112 and 114. The memory control and CY bus interface 959 is coupled to buses 106b and 111 in order to provide addresses and data respectively to the lower 32 bits of the DRAM memory.

Figure 11:
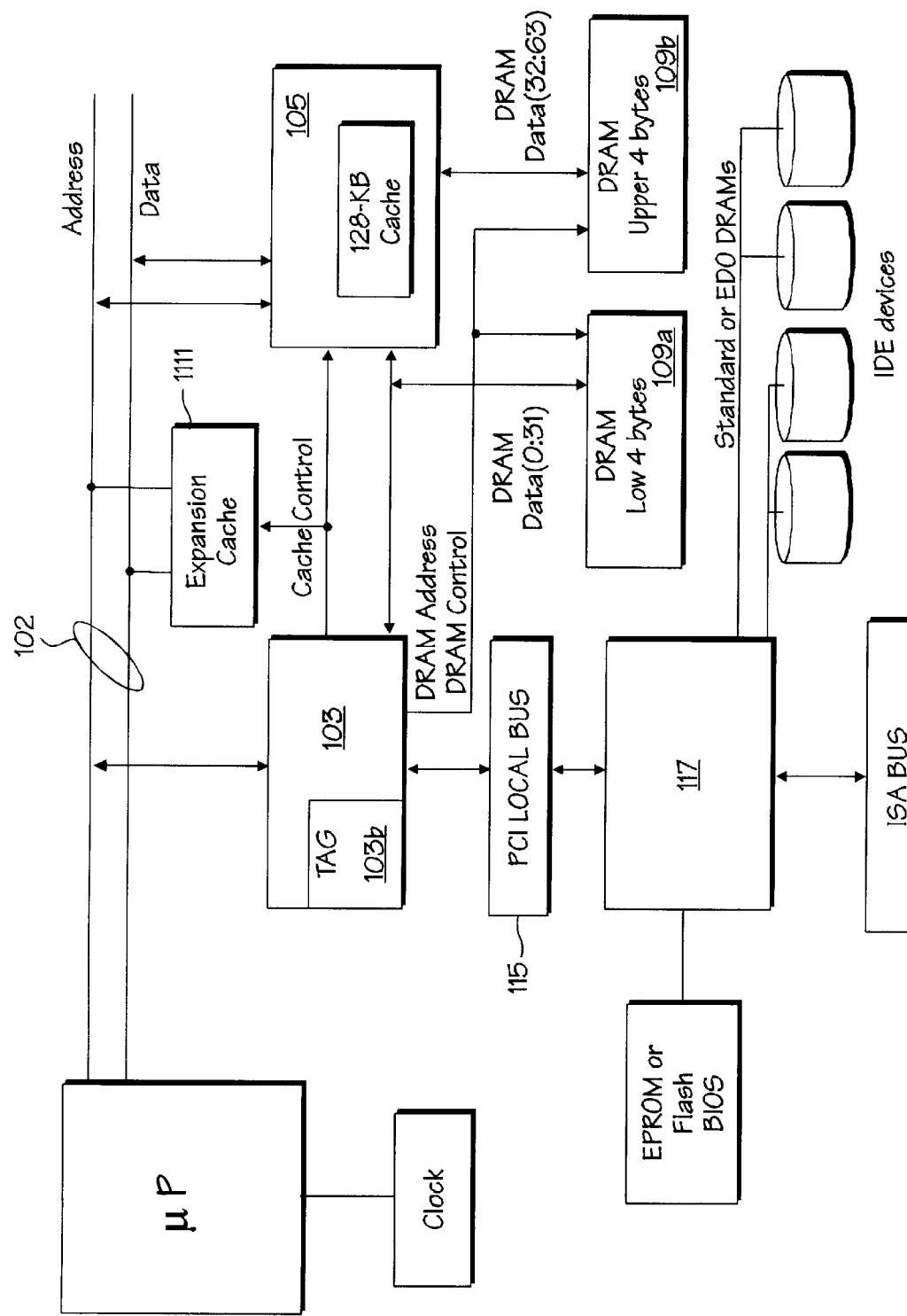
FIG. 11 shows an embodiment of the present invention which utilizes additional cache to further improve the performance of the computer system.

FIG. 11 shows an alternative embodiment of the present invention which may utilize ICs 103 and 105 in conjunction with additional cache memory in the form of additional SRAM. This additional SRAM III is coupled to the processor bus 102 and the cache control lines from the IC 103 as shown in FIG. 11. Thus, rather than having to provide a larger IC 105 which includes a larger amount of cache, the present invention allows for the external expansion of cache memory allowing the user upgradability and lower cost initially for a computer system without the additional expansion cache. By interleaving the pads on the IC 105 in the manner described above, the IC 105 may be used as an expansion cache itself (disabling the logic used to provide data paths between the MD and CY data buses), and enabling the SRAM control logic) and the pinout configuration of this IC will be consistent with certain pinout configurations.

The present invention has been described with reference to various specific embodiments and alternatives thereto. It will be appreciated that upon reference to this description, numerous alternative embodiments are possible which are consistent with the spirit and scope of the present invention, and it is understood that the present invention is defined by the following claims.

We claim:

1. A circuit comprising:

a random access memory (RAM) array on a substrate;

a first multiplexer on said substrate coupled to said RAM array and having an output for coupling to a first bus;

a second multiplexer on said substrate, coupled to said RAM array and having an output for coupling to a second bus;

a RAM control circuit coupled to said RAM array for receiving address signals from said first bus;

one or more first-in-first-out (FIFO) memory arrays for providing data to at least one of said multiplexers; and first control logic for providing first control signals for said multiplexers and said one or more FIFOs.

2. A circuit as in claim 1, wherein said second bus comprises a first data bus and a second data bus, said second multiplexer is coupled to said first data bus, and said circuit further comprises a third multiplexer for coupling to said second data bus.

3. A circuit as in claim 2 wherein said third multiplexer comprises an input for coupling to said first data bus and an output for coupling to said second data bus.

4. A circuit as in claim 2 wherein said RAM array comprises static RAM (SRAM).

5. A circuit as in claim 1 further comprising:
second control logic coupled to control outputs of said circuit to provide second control signals for use in controlling a plurality of memory circuits adapted to be coupled to said second bus.

6. A circuit as in claim 1 wherein said RAM array comprises static RAM (SRAM).

7. A circuit as in claim 6, wherein said first multiplexer is coupled to an output of said RAM array through a first input and further comprises a second input coupled to said second bus.

8. A circuit as in claim 7 for use with a second circuit, said second circuit comprising:
second control logic coupled to said RAM array and coupled to control outputs of said second circuit to provide second control signals for use in controlling memory adapted to be coupled to said second bus and for use in controlling an interface with a microprocessor coupled to said first bus.

9. A circuit as in claim 8, wherein said second control signals are further for use in controlling a third bus and components adapted to be coupled to said third bus.

10. A circuit as in claim 9 wherein said second circuit further comprises a comparator coupled to a TAG RAM array for comparing addresses in said TAG RAM array to addresses on said first bus.

11. A circuit as in claim 7 further comprising a first plurality of pads on said circuit for coupling to said first bus and a second plurality of pads on said circuit for coupling to said second bus, wherein at least a first portion of said first plurality of pads are interleaved with a second portion of said second plurality of pads near the periphery of said circuit.

12. A circuit as in claim 11 wherein said first portion of said first plurality of pads comprising first, third and fifth pads is interleaved with said second portion of said second plurality of pads comprising second, fourth and sixth pads such that said first, second, third, fourth, fifth and sixth pads are disposed in a linear row near the periphery of said circuit and said first pad is adjacent said second pad, which is adjacent said third pad, which is adjacent said fourth pad, which is adjacent said fifth pad which is adjacent said sixth pad.

13. A circuit as in claim 12 wherein said second multiplexer further comprises an input for coupling to said second bus, and wherein a first group of said second portion of said second plurality of pads are on one side of said circuit and couple to said first bus, and wherein a second group of said second portion of said second plurality of pads are on an opposing side of said circuit and couple to said second bus.

14. A circuit as in claim 12, said circuit further comprising:
second control logic coupled to said RAM array and coupled to control outputs of said circuit to provide second control signals for use in controlling a plurality of memory circuits adapted to be coupled to said second bus and in controlling an interface with a microprocessor coupled to said first bus.

15. A circuit as in claim 12 for use with a second circuit, said second circuit comprising:
second control logic coupled to said RAM array and coupled to control outputs of said second circuit to provide second control signals for use in controlling memory adapted to be coupled to said second bus and for use in controlling an interface with a microprocessor coupled to said first bus.

16. A circuit as in claim 15 further wherein said second circuit further comprises a TAG RAM array for storing a directory of entries in said RAM array.

17. A circuit as in claim 16 wherein said second circuit further comprises a comparator coupled to said TAG RAM array for comparing addresses in said TAG RAM array to addresses on said first bus.

18. A circuit as in claim 6, wherein said first multiplexer is coupled to an output of said RAM array through a first input and further comprises a second input for coupling to a third bus.

19. A circuit as in claim 6 further comprising:
second control logic coupled to said RAM array and coupled to control outputs of said circuit to provide second control signals for use in controlling a plurality of memory circuits adapted to be coupled to said second bus and in controlling an interface with a microprocessor coupled to said first bus.

20. A circuit as in claim 19 further comprising a TAG RAM array for storing a directory of entries in said RAM array.

21. A circuit as in claim 20, further comprising a comparator coupled to said TAG RAM array for comparing addresses in said TAG RAM array to addresses on said first bus.

22. A circuit as in claim 19 further comprising a third multiplexer having an input for coupling to said second bus and an output for coupling to a third bus.

23. A circuit as in claim 1 further comprising:
clock logic coupled to a clock control input on said circuit, said clock logic stopping a clock signal to stop clocking operations for said RAM array.

24. A circuit as in claim 23 wherein said clock logic is coupled to a plurality of registers which are coupled to said RAM array, and wherein said RAM array comprises static RAM (SRAM).

25. A circuit as in claim 24, wherein said first multiplexer is coupled to an output of said RAM array through a first input and further comprises a second input coupled to said second bus.

26. A circuit as in claim 25 further comprising:
second control logic coupled to said RAM array and coupled to control outputs of said circuit to provide second control signals for use in controlling memory adapted to be coupled to said second bus and for use in controlling an interface with a microprocessor coupled to said first bus.

27. A circuit as in claim 25 for use with a second circuit, said second circuit comprising:
second control logic coupled to said RAM array and coupled to control outputs of said second circuit to provide second control signals for use in controlling memory adapted to be coupled to said second bus and for use in controlling an interface with a microprocessor coupled to said first bus.

28. A circuit as in claim 27, wherein said second control signals are further for use in controlling a third bus and components adapted to be coupled to said third bus.

29. A circuit as in claim 28 further wherein said second circuit further comprises a TAG RAM array for storing a directory of entries in said RAM array.

30. A circuit as in claim 29 wherein said second circuit further comprises a comparator coupled to said TAG RAM array for comparing addresses in said TAG RAM array to addresses on said first bus.

31. A circuit as in claim 27, wherein said second control signals are further for use in controlling a peripheral bus and components adapted to be coupled to said third bus, wherein said second circuit further comprises a TAG RAM array for storing a directory of entries in said RAM array, and wherein said second circuit further comprises a comparator coupled to said TAG RAM array for comparing addresses in said TAG RAM array to addresses on said first bus.

32. A circuit as in claim 24 wherein said second multiplexer further comprises an input for coupling to said second bus, and said circuit further comprises a third multiplexer having an input for coupling to said second bus and an output for coupling to a third bus.

33. The circuit of claim 1 further comprising memory control logic on said substrate coupled to said RAM array and controlling access to said RAM array.

34. The circuit of claim 1 further comprising one or more first-in-first-out memories configured to communicate with an off-chip memory circuit or a control circuit located on a second substrate.

35. The circuit of claim 1 further comprising a first input for coupling to said first bus and a second input for coupling to said second bus, wherein said first bus and said second bus are each bi-directional.

36. A computer system comprising:
    a microprocessor;
    a first memory bus;
    a second memory bus;
    a processor bus coupled to said microprocessor;
    a circuit on a single substrate coupled to said processor bus and to each of said first and second memory busses, said circuit comprising a random access memory (RAM) array, a first multiplexer having an output coupled to said processor bus and having a first input coupled to an output of said RAM array and a second input coupled to said first memory bus, a second multiplexer having an output coupled to said first memory bus and an input coupled to said RAM array, a third multiplexer having an input coupled to said RAM array and an output coupled to said second memory bus; and
    control logic controlling said first and second multiplexer.

37. A computer system as in claim 36 wherein said RAM array comprises static RAM, said computer system further comprising a dynamic RAM array coupled to said first memory bus.

38. A computer system, comprising:
    a processor;
    a memory bus;
    a circuit comprising:
        a random access memory (RAM) array on a substrate;
        a first multiplexer on said substrate coupled to said RAM array and having an output for coupling to a first bus;
        a second multiplexer on said substrate, coupled to said RAM array and having an output for coupling to a second bus;
        a RAM control circuit coupled to said RAM array for receiving address signals from said first bus;
        one or more first-in-first-out (FIFO) memory arrays for providing data to at least one of said multiplexers;
        first control logic for providing first control signals for said multiplexers and said one or more FIFOs; and
    wherein said processor is coupled to said first bus and said memory bus comprises said second bus.

* * * * *